(12) United States Patent
Brandin

(10) Patent No.: US 8,421,593 B2
(45) Date of Patent: Apr. 16, 2013

(54) APPARATUS, SYSTEMS AND METHODS FOR AUTHENTICATION OF OBJECTS HAVING MULTIPLE COMPONENTS

(76) Inventor: Bertil A. Brandin, Pully (CH)

( * ) Notice: Subject to any disclaimer, the term of this patent is extended or adjusted under 35 U.S.C. 154(b) by 1164 days.

(21) Appl. No.: 12/222,359

(22) Filed: Aug. 7, 2008

(65) Prior Publication Data

US 2010/0033300 A1    Feb. 11, 2010

(51) Int. Cl.
```
G05B 23/00      (2006.01)
G05B 19/00      (2006.01)
G08B 13/14      (2006.01)
H04L 9/00       (2006.01)
H04L 9/08       (2006.01)
G06F 17/00      (2006.01)
```
(52) U.S. Cl.
USPC .......... 340/5.8; 340/5.92; 340/572.1; 380/44; 380/278; 235/375; 235/380; 235/385; 713/175

(58) Field of Classification Search ............ 340/5.8, 340/825.3, 825.33, 825.34, 10.2, 10.3, 10.32, 340/10.1, 572.1, 572.2, 572.4, 10.4, 10.42, 340/10.51, 10.52, 10.41, 539.13, 870.11, 340/825.73, 7.21, 825.69, 825.72, 572, 505, 340/825.54, 825.31, 825.49, 572.7; 713/176; 382/115, 116, 117, 118, 119, 120, 121, 122, 382/123, 232; 705/22, 28
See application file for complete search history.

(56) References Cited

U.S. PATENT DOCUMENTS

| | | | |
|---|---|---|---|
| 5,267,756 A | 12/1993 | Molee et al. | |
| 5,971,435 A | 10/1999 | DiCesare et al. | |
| 6,069,955 A * | 5/2000 | Coppersmith et al. | 380/54 |
| 6,226,619 B1 | 5/2001 | Halperin et al. | |
| 6,591,252 B1 | 7/2003 | Young | |
| 6,612,494 B1 | 9/2003 | Outwater | |
| 6,706,314 B2 | 3/2004 | Butland | |
| 6,898,714 B1 * | 5/2005 | Nadalin et al. | 726/5 |
| 7,131,581 B2 | 11/2006 | Shaw | |
| 7,234,060 B1 * | 6/2007 | Amdur et al. | 713/176 |
| 7,277,601 B2 | 10/2007 | Zorab et al. | |
| 7,468,669 B1 * | 12/2008 | Beck et al. | 340/572.1 |
| 2004/0088231 A1 | 5/2004 | Davis, Jr. | |
| 2004/0172535 A1 * | 9/2004 | Jakobsson et al. | 713/168 |
| 2006/0005027 A1 * | 1/2006 | Tseng | 713/176 |
| 2006/0091207 A1 * | 5/2006 | Chang | 235/385 |
| 2007/0187266 A1 | 8/2007 | Porter et al. | |
| 2009/0169019 A1 * | 7/2009 | Bauchot et al. | 380/278 |

FOREIGN PATENT DOCUMENTS

WO    WO 2007113040 A1 * 10/2007

* cited by examiner

*Primary Examiner* — Jennifer Mehmood
*Assistant Examiner* — Mirza Alam

(57) ABSTRACT

Apparatus, systems and methods for authenticating objects, comprising receiving an encrypted object identifier associated with an unknown object having multiple components, decrypting the encrypted object identifier using a first public key of a first public/private key pair to obtain unknown object information including unknown identification data for the multiple components, inspecting the unknown object to obtain actual object information including actual identification data for the multiple components, and comparing the unknown identification data with the actual identification data to determine whether the unknown object is an authentic object, wherein an authentic object has an object identifier generated using a first private key of the first public/private key pair to encrypt the actual object information.

20 Claims, 12 Drawing Sheets

APPARATUS, SYSTEMS AND METHODS FOR AUTHENTICATION OF OBJECTS HAVING MULTIPLE COMPONENTS

TECHNICAL FIELD

The present invention relates to apparatus, systems and methods for authentication, and in particular to apparatus, systems and methods for authentication of objects and ownership of objects using asymmetric cryptography.

BACKGROUND

Apparatus, systems and methods for authentication of objects serve a valuable role in modern commercial transactions. For example, authentication may be particularly useful in e-commerce transactions where goods are being bought and sold over the Internet and the buyer and seller never actually meet, thus making it difficult to establish a trusted relationship between the buyer and seller.

More generally, authentication of objects and confirmation of ownership may help in combating counterfeiting of goods. Counterfeiting is estimated to cost billions of dollars each year to companies located around the world. Counterfeit goods compete with legitimate goods, often at greatly reduced prices, and may make it difficult to sell legitimate goods at or near their true market value. Furthermore, counterfeit goods may be of inferior or lesser quality, and may be inherently dangerous to consumers, or may otherwise impact or harm the goodwill of the legitimate manufacturers.

Counterfeiting is particularly problematic in high-end or designer products, where a significant amount of the market value of the object may lie in its design. Such high-end goods are often costly to develop but relatively inexpensive to copy. Consumers purchasing high-end products generally desire certainty that they are purchasing authentic brand-name products from a legitimate source, and not imitation or knock-off goods.

Counterfeiting has become increasingly problematic in recent years, as the quality of knock-off goods continues to increase, and it is becoming ever more difficult for consumers to immediately distinguish legitimate products from imitation goods. Thus, it is desirable to have systems for authenticating objects and ownership of objects.

Various approaches to authentication systems have been proposed. For example, Coppersmith et al. (U.S. Pat. No. 6,069,955) discloses a visible seal or label containing a serial number that is placed in plain view on product packaging. The visible label contains the serial number as well as a first private key encrypted version of the serial number. A second or hidden label inside of the package has thereon a second encrypted version of the serial number made using a second private key. The hidden label may be secured inside the package out of sight or placed on the back of the visible label and therefore viewable through a transparent case when opened or visible when peeled off. The private keys are known only to the manufacturer. Using a corresponding public key provided by the manufacturer, the consumer, law enforcement agent, or customs inspector can verify that the encrypted version matches the serial number. For example, using a point of sale machine equipped with the public key, a sales clerk can authenticate the product in front of the consumer at the time of purchase.

Asymmetric cryptography, also known as public key cryptography, is a type of cryptography that does not rely on a shared secret between two parties. Rather, in asymmetric cryptography, a party may have two different keys: a public key, which is publicly known, and a private key, which is known only to that party. Due to the mathematical relationship between the public and private keys in a key pair, data encrypted using a particular public key may only be decrypted using the corresponding private key (assuming that the public/private key pair has not been compromised). Conversely, data encrypted using a particular private key may only be decrypted using the corresponding public key.

Zorab et al. (U.S. Pat. No. 7,277,601) discloses an authentication and/or tracking system for identifying, tracking, authenticating and/or otherwise checking the legitimacy of one or more items that include a coded identity tag or mark. The system comprises identification means for reading the coded identity tag or mark and identifying said one or more items, storage means for storing information relating to the location, whether actual or intended, origin and/or ownership of said one or more items, and means for displaying or otherwise providing or verifying the information relating to an item when its identity tag or mark has been read.

Shaw (U.S. Pat. No. 7,131,581) discloses a system for authenticating an item, the item being associated with an event or with one or more participants in the event. The system comprises first identification means incorporated into an item prior to an event, the first identification means having an associated unique identifier, a database for storing an item record including information indicative of the unique identifier and information indicative of the item, and detecting means for authenticating that the item has been used at the event by detecting the first identification means and recognizing the unique identifier during the event whilst the item is being used. The arrangement is such that the item record is updated so as to include information indicative of the event in which the item has been used when the item has been detected by the detecting means.

However, these known approaches do not adequately address authentication of objects and ownership of objects. There is accordingly a need for improved systems, methods and apparatus for authenticating objects and ownership of objects that overcome at least some of the disadvantages of the above noted systems.

SUMMARY

According to one aspect of the invention, there is provided a method of authenticating objects, comprising receiving an encrypted object identifier associated with an unknown object having multiple components, decrypting the encrypted object identifier using a first public key of a first public/private key pair to obtain unknown object information including unknown identification data for the multiple components, inspecting the unknown object to obtain actual object information including actual identification data for the multiple components, and comparing the unknown identification data with the actual identification data to determine whether the unknown object is an authentic object, wherein an authentic object has an object identifier generated using a first private key of the first public/private key pair to encrypt the actual object information.

In some embodiments, the actual identification data of the multiple components may include actual arrangement information for the multiple components, the unknown identification data may include unknown object arrangement information, and the comparing step includes comparing the actual arrangement information with the unknown arrangement information to determine whether the unknown object is an authentic object.

In some embodiments, the actual arrangement information includes one or more of pattern, configuration or sequence data about the multiple components.

In some embodiments, the method further comprises comparing the unknown object information with actual object information recorded in at least one database to determine whether the unknown object is an authentic object.

In some embodiments, the actual object information includes actual manufacturing information recorded in at least one database, the unknown object information includes unknown manufacturing information, and the comparing step includes comparing the actual manufacturing information with the unknown manufacturing information to determine whether the unknown object is an authentic object.

In some embodiments, the actual object information includes actual random data recorded in at least one database, the unknown object information includes unknown random data, and the comparing step includes comparing the unknown random data with the actual random data to determine whether the unknown object is an authentic object.

In some embodiments, each of the multiple components of the unknown object has an RFID tag associated therewith, each RFID tag contains the actual identification data for the associated component, and the method further comprises providing a tag reader configured to read the RFID tags and perform the comparing step to determine whether the unknown object is an authentic object.

In some embodiments, each of the multiple components of the unknown object has an optical tag associated therewith, each optical tag contains the actual identification data for the associated component, and the method further comprises providing an optical tag reader configured to read the optical tags and perform the comparing step to determine whether the unknown object is an authentic object.

In some embodiments, each optical tag is a bar code and the optical tag reader is a bar code reader.

In some embodiments, the method further comprises receiving an ownership certificate associated with the unknown object, decrypting the ownership certificate using a second public key of a second public/private key pair to obtain actual ownership information for the unknown object, inspecting purported ownership information about a purported owner of the unknown object, and comparing the actual ownership information obtained by decrypting the ownership certificate with the purported ownership information about the purported owner to determine whether the purported owner is the actual owner.

In some embodiments, the ownership certificate was encrypted using a second private key of the second public/private key pair.

In some embodiments, the method further comprises comparing the purported ownership information obtained by decrypting the ownership certificate with ownership information recorded in at least one database to determine if the purported owner is the actual owner.

In some embodiments, the comparing of the purported ownership information obtained with the ownership information recorded in at least one database includes comparing random data decrypted from the ownership certificate with actual random data stored in at least one database.

According to another aspect of the invention, there is provided a method of authenticating objects, comprising providing an authentic object having multiple components, each component having actual identification data associated therewith, generating an encrypted object identifier using a first private key of a first public/private key pair to encrypt actual object information including the actual identification data about the multiple components of the object, and associating the object identifier with the authentic object.

In some embodiments, the method further comprises receiving an unknown object identifier associated with an unknown object having multiple components, decrypting the unknown object identifier using a first public key of the first public/private key pair to obtain unknown object information including unknown identification data, inspecting the unknown object to obtain actual object information including identification data for the multiple components, and comparing the unknown identification data with the actual identification data to determine whether the unknown object is the authentic object.

According to yet another aspect of the invention, there is provided a system for authenticating objects, comprising at least one database for storing data records associated with at least one object, and at least one processor coupled to the database, the at least one processor being operable to receive an encrypted object identifier associated with an unknown object of the at least one object, the unknown object having multiple components, decrypt the encrypted object identifier using a first public key of a first public/private key pair to obtain unknown object information including unknown identification data for the multiple components, inspect the unknown object to obtain actual object information including actual identification data for the multiple components, and compare the unknown identification data with the actual identification data to determine whether the unknown object is an authentic object, wherein an authentic object has an object identifier generated using a first private key of the first public/private key pair to encrypt the actual object information.

Other aspects and features of the present specification will become apparent to those ordinarily skilled in the art upon review of the following description.

BRIEF DESCRIPTION OF THE DRAWINGS

The drawings included herewith are for illustrating various examples of systems, methods, and apparatus of the present specification and are not intended to limit the scope of what is taught in any way. In the drawings.

DETAILED DESCRIPTION

Figure 1:
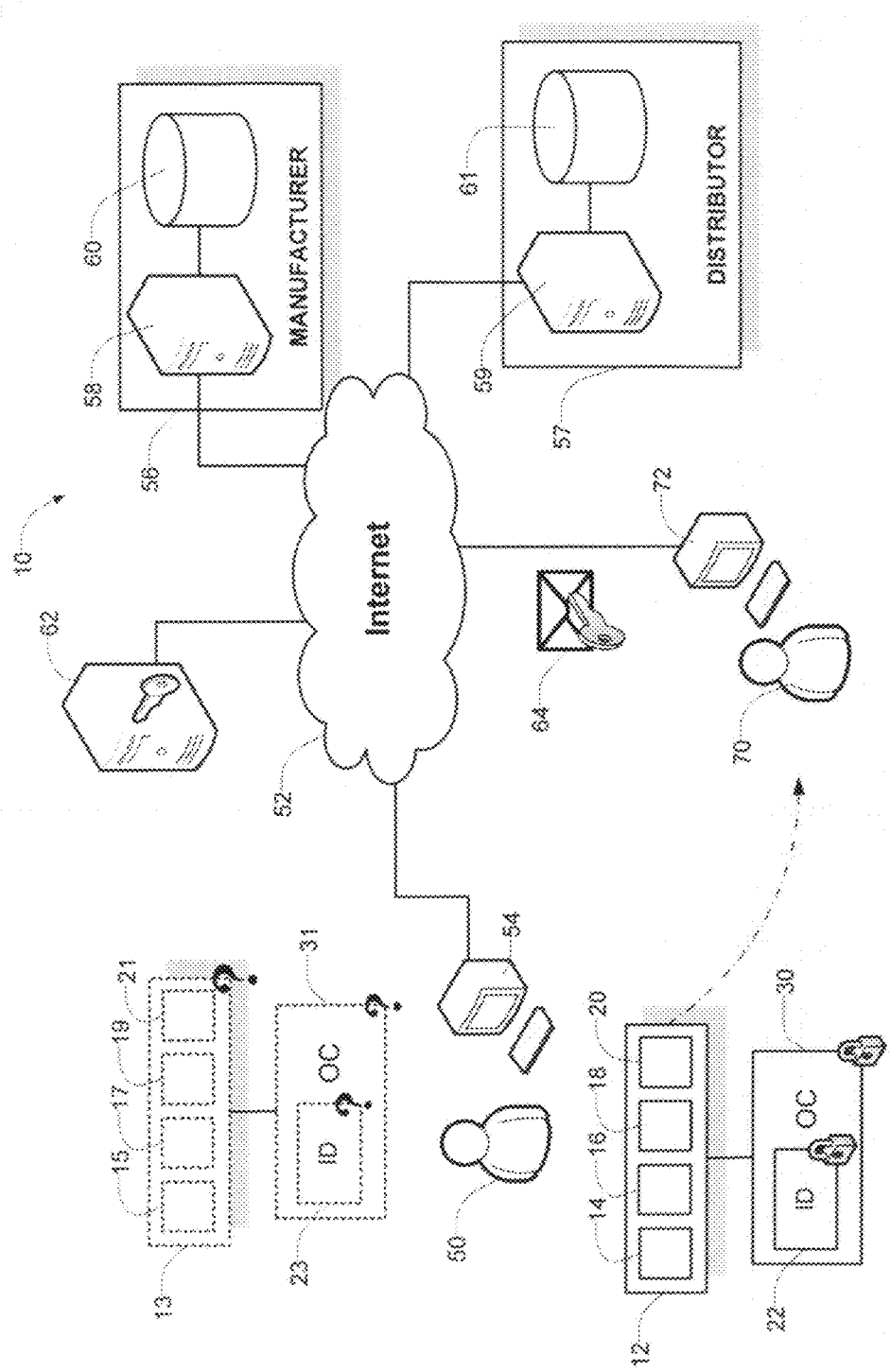
FIG. 1 is a schematic diagram of a system for authenticating objects and ownership of objects according to one embodiment.

Referring now generally to FIG. 1, shown therein is an authentication and certification system 10 for use in authenticating one or more objects made in accordance with an embodiment of the present invention.

As shown, each object (e.g. object 12) may have multiple components 14, 16, 18, and 20 associated therewith. For example, the object 12 may be a piece of designer furniture made up of different parts (e.g. a table having a table top supported by a plurality of legs) or a custom made lamp that has different parts (e.g. a lampshade made from multiple parts connected in a particular pattern, configuration or sequence). As will be described in further detail below, the system 10 may include manufacturers 56, distributors 57 and certificate authorities 62 who communicate and work together to authenticate objects and the owners of objects.

In some embodiments, one or more users, such as a first user 50 and a second user 70, communicate with the system 10 using one or more communications devices 54 and 72 to obtain confirmation of authenticity of objects and/or ownership. Generally speaking, the communications devices 54 and 72 may be any suitable device for interfacing with a communications network 52 (e.g. the Internet), for example, a personal computer, a terminal, a laptop or a mobile device such as a smart phone, PDA or cellular phone. In some embodiments, the communications devices 54 and 72 may be used to display web pages or other client applications through which users may request authentication of objects.

Generally, the manufacturers 56 manufacture the objects that are subsequently authenticated by the system 10. Each manufacturer 56 may have a manufacturer processor 58 (e.g. a server) which may be operable to: record data about the objects that are manufactured (e.g. by storing data records associated with the objects in a manufacturer database 60), encrypt and decrypt data associated with the objects (e.g. using public/private key pairs obtained from the certificate authorities or generated using a software application), and determine whether objects are in fact authentic by comparing information about the objects to information recorded in the database 60.

In some embodiments, the manufacturer 56 may generate both corresponding public and private keys using a software application. As needed, the manufacturer 56 selectively distributes or publishes the public key, keeping the private key secret. For example, the public key may be stored with a certificate authority 62 such that it can be downloaded via the Internet 52.

The manufacturer 56 can encrypt product information about a particular object using the private key. Once the product information has been encrypted, any user with access to the manufacturing public key (e.g. the first user 50) can decrypt the encrypted product information. Since the manufacturing public key can only be used to decrypt information encrypted with the corresponding manufacturing private key, any user who succeeds in decrypting the product information is generally guaranteed that the product information is authentic.

The distributors 57 (also called resellers or intermediaries) may perform several different functions. For example, the distributors 57 may purchase objects from the manufacturer 56 and resell those objects to the users of the system 10. The distributors 57 may also facilitate the resale of objects between different users. For example, a particular distributor 57 may act as an intermediary between the first user 50 and the second user 70 when the first user 50 is selling the object 12 to the second user 70.

Each distributor 57 may have a distributor processor 59. The distributor processor 59 may be operable to: record information about the objects being distributed (e.g. by storing data records associated with the objects and/or the owners of the objects in a distributor database 61), encrypt and decrypt information associated with the ownership of particular objects (e.g. using public/private key pairs obtained from the certificate authorities 62), and determine whether purported owners of objects are in fact the actual owners of those objects.

In some embodiments, the distributor 57 may generate both public and private keys using a software application. As needed, the distributor selectively distributes or publishes the public key, keeping the private key secret. The distributor 57 then encrypts owner information about a particular object using the private key. Any person with access to the distribution public key (e.g. the second user 70) can decrypt the encrypted owner information.

Since the distribution public key can only be used to decrypt information that has been encrypted with the distribution private key, any person with access to the distribution public key who succeeds in decrypting the ownership information is generally guaranteed that the ownership information is authentic.

In some embodiments, the manufacturers 56 and the distributors 57 may be different entities. Alternatively, the manufacturers 56 and the distributors 57 may be related entities, or may in fact be the same entity.

Figure 2:
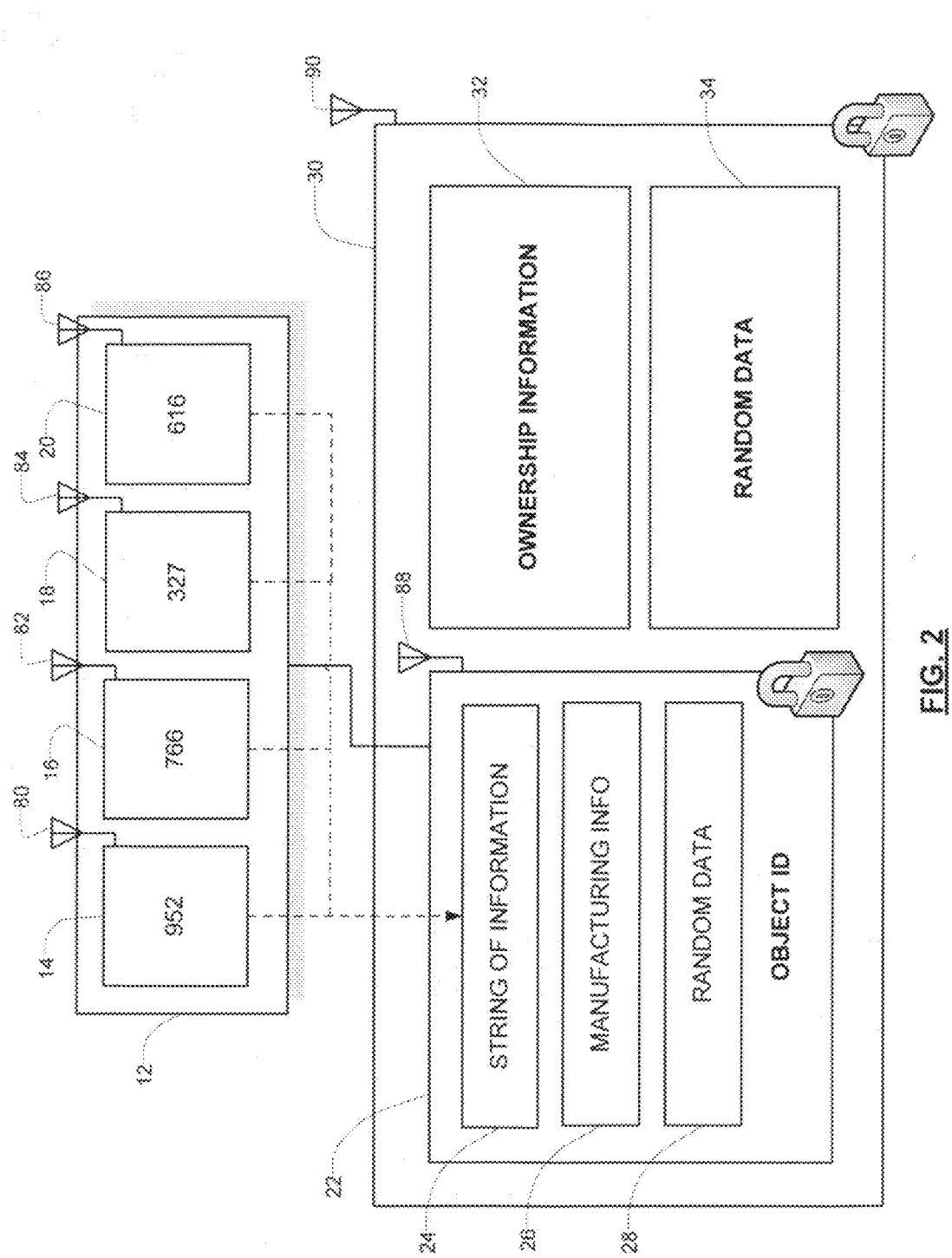
FIG. 2 is a schematic diagram of an object having an object identifier and ownership certificate associated therewith.

Turning now to FIG. 2, as described above, each object 12 may have a number of components 14, 16, 18, and 20 associated therewith. In some embodiments, one or more of the components 14, 16, 18, and 20 may include associated identification data. The associated identification data may include alphanumeric data, such as a series of letters, numbers, or any combination thereof.

In some embodiments, the identification data may be unique for each component 14, 16, 18 and 20. For example, as shown the first component 14 has identification data that comprises the number '952', the second component 16 has identification data that comprises the number '766', the third component 18 has identification data that comprises the number '327', and the fourth component 20 has identification data that comprises the number '616'.

In some embodiments, the components 14, 16, 18, and 20 may be assembled, coupled or linked together in a particular arrangement (e.g. a pattern, configuration or sequence). This may be the case where the design of the object 12 requires a particular pattern, configuration or sequence of the components 14, 16, 18 and 20. For example, the object 12 could be a lamp, with the first component 14 being a part of the lamp shade having a specific shape or color, the first component 14 being coupled to the second component 16 that also has a particular shape or color, and so on. The pattern, configuration or sequence of components 14, 16, 18 and 20 may be selected or arranged so as to provide the object 12 with particular aesthetic or functional qualities.

In some embodiments, the pattern, configuration or sequence constitutes an interesting feature of the object 12 which can be used for authentication purposes as will be described in further detail below. The pattern, configuration or sequence may provide identifying information for the object 12 which can be verified by visual, radio frequency or other inspection means, is typically difficult to guess, and references the various object components 14, 16, 18 and 20.

In some embodiments, the information data associated with each component 14, 16, 18 and 20 may include information about other components 14, 16, 18 and 20 in the pattern, configuration or sequence. For example, the information data for each component 14, 16, 18 and 20 may have information about adjacent components. In one example, the information data of the first component 14 may include the number '952' as well as the number '766' from the second component 16. Similarly, the information data of the second component 16 may include the number '766' as well as the number '952' from the first component 14 and/or the number '327' from the third component 18.

Thus, each component 14, 16, 18 and 20 may know some information about its location or place within the particular pattern, configuration or sequence of components 14, 16, 18, and 20, which may subsequently be used to determine (by visual or other inspection means) whether all of the pieces or components are present or are in the proper pattern, configuration or sequence. This provides a way for a user (e.g. user 50) to visually or otherwise check whether the object 12 matches the description that is provided in an encrypted object identifier (as described in further detail below).

As shown in FIGS. 1 and 2, each object 12 generally has an encrypted object identifier 22 associated therewith. The manufacturer 56 typically generates the encrypted object identifier 22 when the object 12 is manufactured, although it will be appreciated that the encrypted object identifier 22 could be added at a different time and/or by a different entity (for example, in some embodiments, the distributors 57 could generate encrypted object identifiers 22).

The encrypted object identifier 22 generally includes the identification data of each of the components of the object 12 (e.g. components 14, 16, 18 and 20) stored as a string of information 24. For example, the string of information 24 as shown may include the following data: 952, 766, 327, and 616 corresponding to the identification data associated with each of the components 14, 16, 18 and 20.

In some embodiments, the string of information 24 may also include arrangement information about the components (e.g. information about the particular pattern, configuration or sequence of the components 14, 16, 18 and 20). For example, the string of information 24 may include the following numerical data: 952766327616, which includes the identification data for each of the components 14, 16, 18 and 20, as well as indicates the order in which the components 14, 16, 18 and 20 are arranged. The string of information 24 may be checked by visual or other inspection means against the actual identity and arrangement (e.g. pattern, configuration or sequence) of the components 14, 16, 18 and 20 of object 12.

In some embodiments, the encrypted object identifier 22 may also include manufacturing information 26 about the object 12 and/or the particular components 14, 16, 18 and 20 of the object 12. For example, the manufacturing information 26 may include: a model number, a serial number, a date and/or a time when the object 12 and/or the components 14, 16, 18 and 20 of the object 12 were manufactured or added to the object 12, where the object 12 and/or the components 14, 16, 18 and 20 of the object 12 were manufactured, and so on.

The encrypted object identifier 22 and may also include random data 28 generated by the manufacturer 56 of the object 12 during manufacturing. For example, the random data 28 may be a sequence of ten or more random alphanumeric characters used only once.

Figure 3:
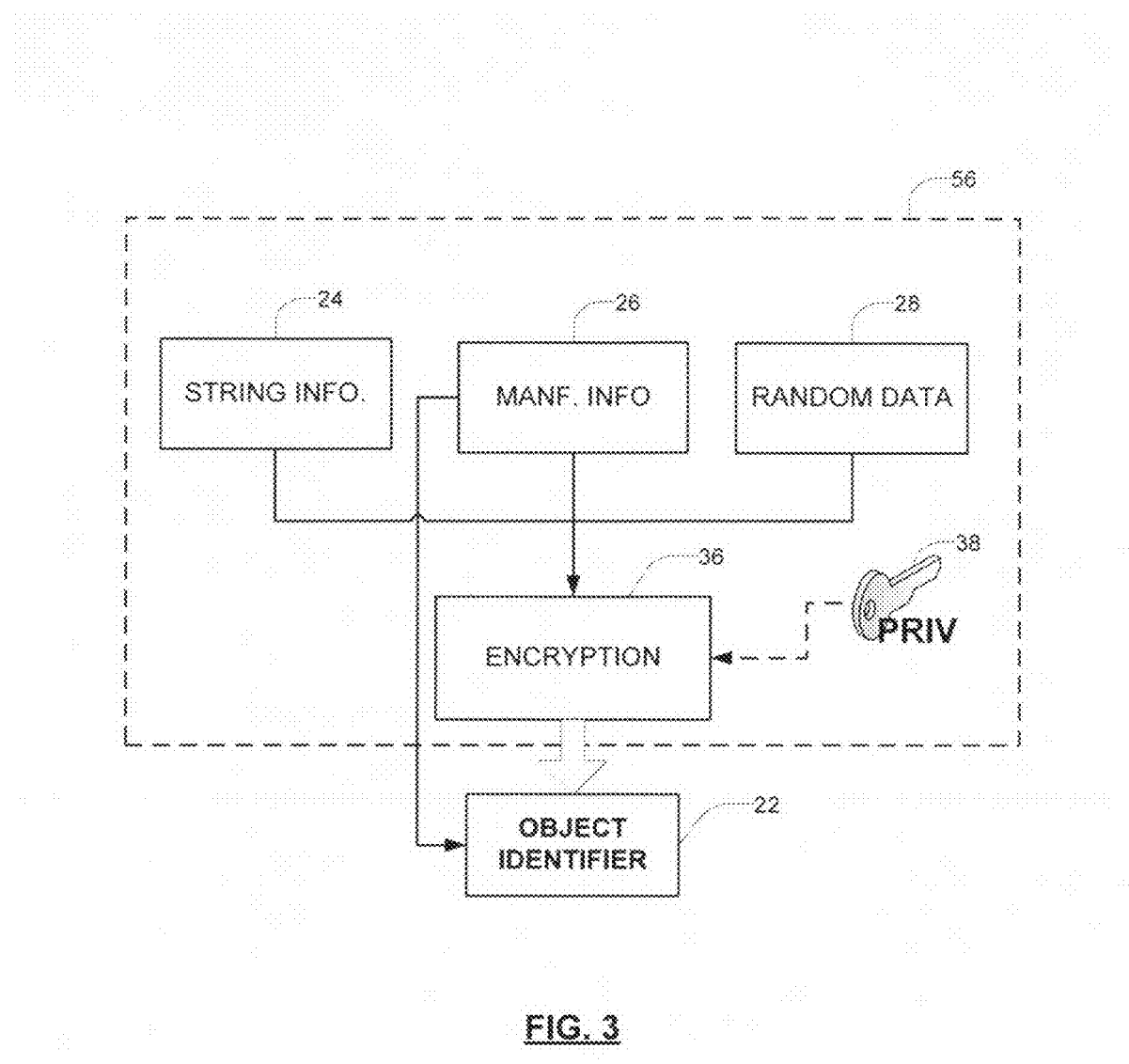
FIG. 3 is a schematic diagram of the object identifier of FIG. 2 encrypted using a first private key of a first public/private key pair.

As shown in FIG. 3, the encrypted object identifier 22 may be generated using a manufacturing private key 38 of a manufacturing public-private key pair that has a corresponding manufacturing public key 42. In some embodiments, the encrypted object identifier 22 may be generated by encrypting object information (including the string of information 24, the manufacturing information 26, and the random data 28) using the manufacturing private key 38 (shown schematically by an encryption block 36 in FIG. 3). For example, the manufacturing processor 58 may generate the encrypted object identifier 22.

Furthermore, in some embodiments, for practical purposes, portions of the manufacturing information 26 may be provided as part of the encrypted object identifier 22 in an unencrypted or clear format. For example, the name of the manufacturer 56 may be provided on the object 12 in an unencrypted format, allowing the manufacturer 56 to be identified by simple visual inspection of the encrypted object identifier 22 without decrypting the encrypted object identifier 22.

Once the encrypted object identifier 22 has been generated, the manufacturer 56 may record a copy of the encrypted object identifier 22 in the manufacturing database 60. The manufacturer 56 may also record other object information about the object 12 in an unencrypted format in association with the encrypted object identifier 22. For example, the manufacturer 56 may record the string of information 24, the manufacturing information 26 and/or random data 28 in the database 60. In some embodiments, the manufacturer 56 may record the unencrypted object information without recording the encrypted object identifier 22.

The encrypted object identifier 22 is then associated with the object 12. For example, the encrypted object identifier 22 may be affixed to the object using a tamper-proof sticker or other visible or optical tag that can be read by visual inspection. Alternatively, the encrypted object identifier 22 may be recorded in an RFID tag affixed to the object 12 and which can be inspected using an RFID tag reader.

In some embodiments, the encrypted object identifier 22 is made public so that it can be observed in its encrypted form by anyone who has access to the object 12. Since the encrypted object identifier 22 was encrypted using the manufacturing private key 38, anyone with access to the corresponding public key 42 is therefore able to decrypt the encrypted object identifier 22 to read the object information contained therein. Thus, the encrypted object identifier 22 may be used to authenticate the object 12.

Figure 4:
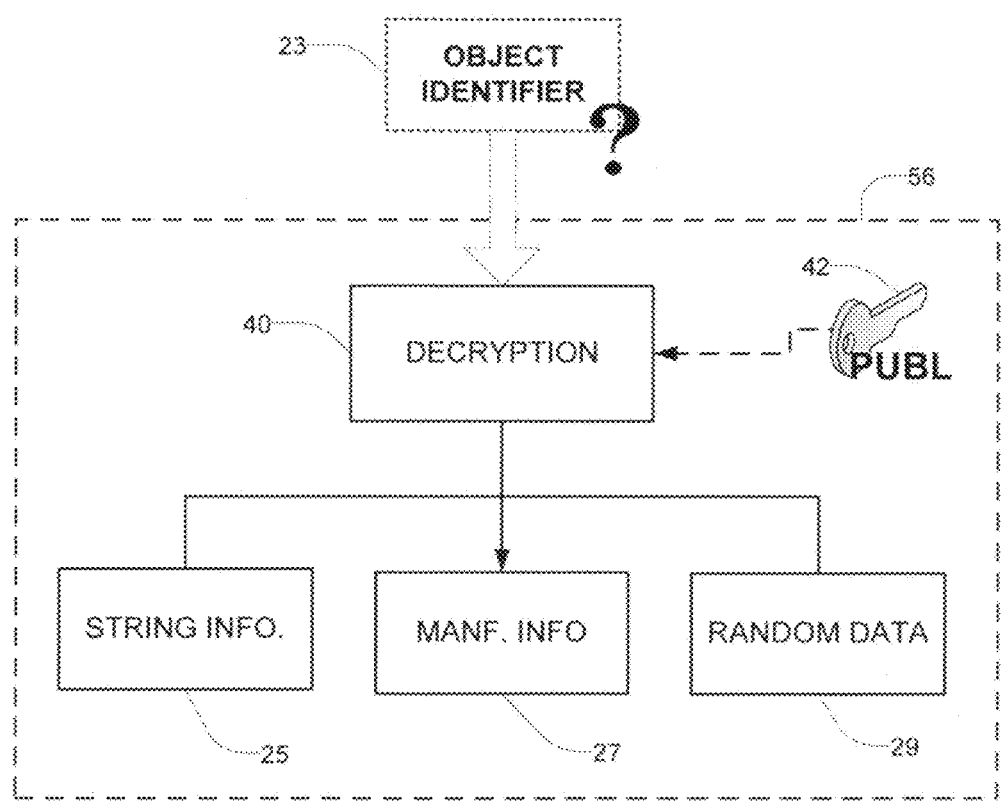
FIG. 4 is a schematic diagram of an unknown object identifier decrypted using a first public key of the first public/private key pair.

For example, as shown in FIGS. 1 and 4, a user (e.g. a customs officer) may desire to authenticate an unauthenticated or unknown object 13 as having been manufactured by a particular manufacturer 56. The unauthenticated or unknown object 13 has an unknown encrypted object identifier 23 associated therewith.

The user first obtains the manufacturing public key 42 associated with the particular manufacturer 56. The user then decrypts the unknown encrypted object identifier 23 using the manufacturer's public key 42 (shown schematically by a decryption block 40). This decryption produces object information about the unauthenticated object 13, including a string of information 25 (which includes information about the components 15, 17, 19 and 21 of the unauthenticated object 13, and which may include arrangement information about the pattern, configuration or sequence of the components 15, 17, 19 and 21), manufacturing information 27, and random data 29 associated with the unauthenticated or unknown object 13.

By inspecting the object information generated from decrypting the unknown encrypted object identifier 23, the user can authenticate the unauthenticated or unknown object 13, as will be described in further detail below.

Figure 5:
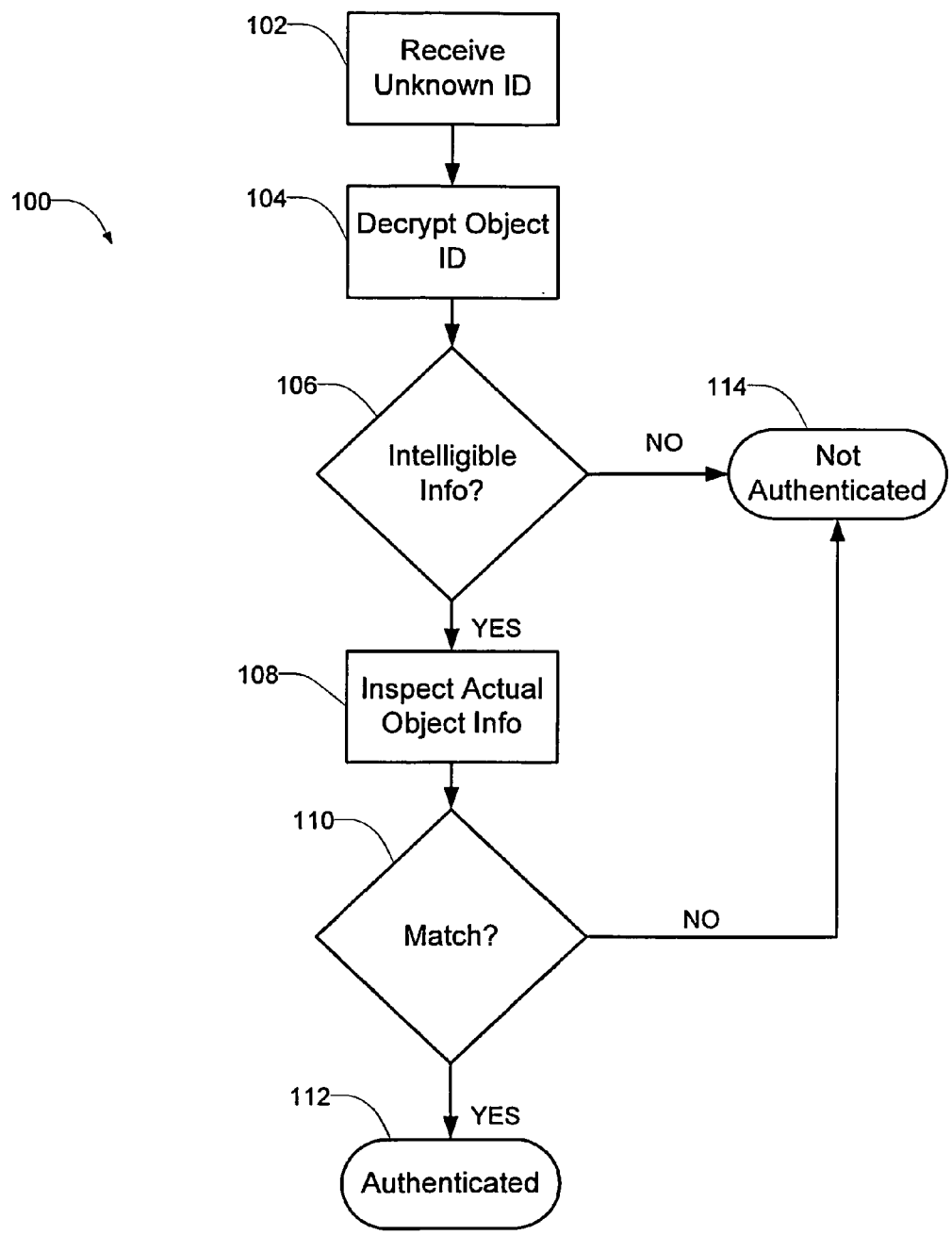
FIG. 5 is a flowchart showing a method of authenticating an object having an object identifier according to one embodiment.

Referring now to FIG. 5, an identification method 100 may be used to determine whether an unknown object 13 is in fact an authentic object.

At step 102, the unknown encrypted object identifier 23 associated with the unknown object 13 is received. For example, the first user 50 may desire to authenticate the unknown object 13, and may obtain the unknown object identifier 23 from the unknown object 13 by scanning the unknown object 13 using an RFID reader, a barcode reader, by visual inspection of the unknown object 13, or otherwise.

At step 104, the unknown encrypted object identifier 23 is decrypted using the manufacturing public key 42 associated with the particular manufacturer 56 of the unauthenticated object 13. The decrypted object identifier produces the string of information 25, the manufacturing information 27, and the random data 29 associated with the unknown object 13. In some embodiments, the string of information 25 may include arrangement information about the components 15, 17, 19 and 21, such as a particular pattern, configuration or sequence.

In some embodiments, the unknown object 13 includes information about the manufacturer 56 displayed in a prominent manner on the unknown object 13, and which may be used to obtain the proper manufacturing public key 42 (e.g. from the certificate authority 62).

At step 106, a determination is made as to whether information decrypted at step 104 is intelligible. For example, since the manufacturer public key 42 can only decrypt information encrypted using the private key 38, if the information at step 106 is not intelligible (i.e. it cannot be read because it contains junk or gibberish data), then this suggests that one or more of the public key 42, private key 38 and/or unknown encrypted object identifier 23 are not authentic. Accordingly, the method proceeds to step 114 and the unknown object 13 is not authenticated.

However, if the decrypted information is intelligible, then this suggests that the unknown encrypted object identifier 23 was generated by the particular manufactured 56, and that the unknown object 13 may be an authentic object. In such cases, the method 100 proceeds to step 108.

At step 108, actual object information associated with the unknown object 13 is inspected. For example, this may involve inspecting the unknown object 13 to obtain identification data about the components 15, 17, 19 and 21 of the unknown object 13.

At step 110, the actual object information retrieved at step 108 is compared with the object information obtained by decrypting the unknown encrypted object identifier 23 (performed at step 106). Then a determination is made as to whether the data matches. For example, the identification data obtained from the string information 25 may be compared to the identification data obtained by inspecting the components 15, 17, 19 and 21. In particular, the arrangement data about the components 15, 17, 19 and 21 obtained from the string of information 25 may be compared with the actual arrangement of the components 15, 17, 19 and 21 as evident by inspection of the unknown object 13.

If there is no match, then this suggests that one or more of the components 15, 17, 19 and 21 and/or the unknown object 13 has been tampered with or are not authentic, and the method 100 proceeds to step 114 where the unknown object 13 is not authenticated.

However, at step 110 if there is a match, then this suggests that the unknown object 13 and the components 15, 17, 19 and 21 are authentic, and the method proceeds to step 112 where the unknown object 13 is authenticated.

Generally speaking, the method 100 as described above may be useful for performing a local authentication of unknown objects (e.g. unknown object 13), as a user may generally authenticate unknown objects without intervention by a third party (provided that the user has the manufacturing public key 42). This may be useful, for example, as a first level of protection against importation of counterfeit goods (e.g. for use by customs officers and the like).

Figure 6:
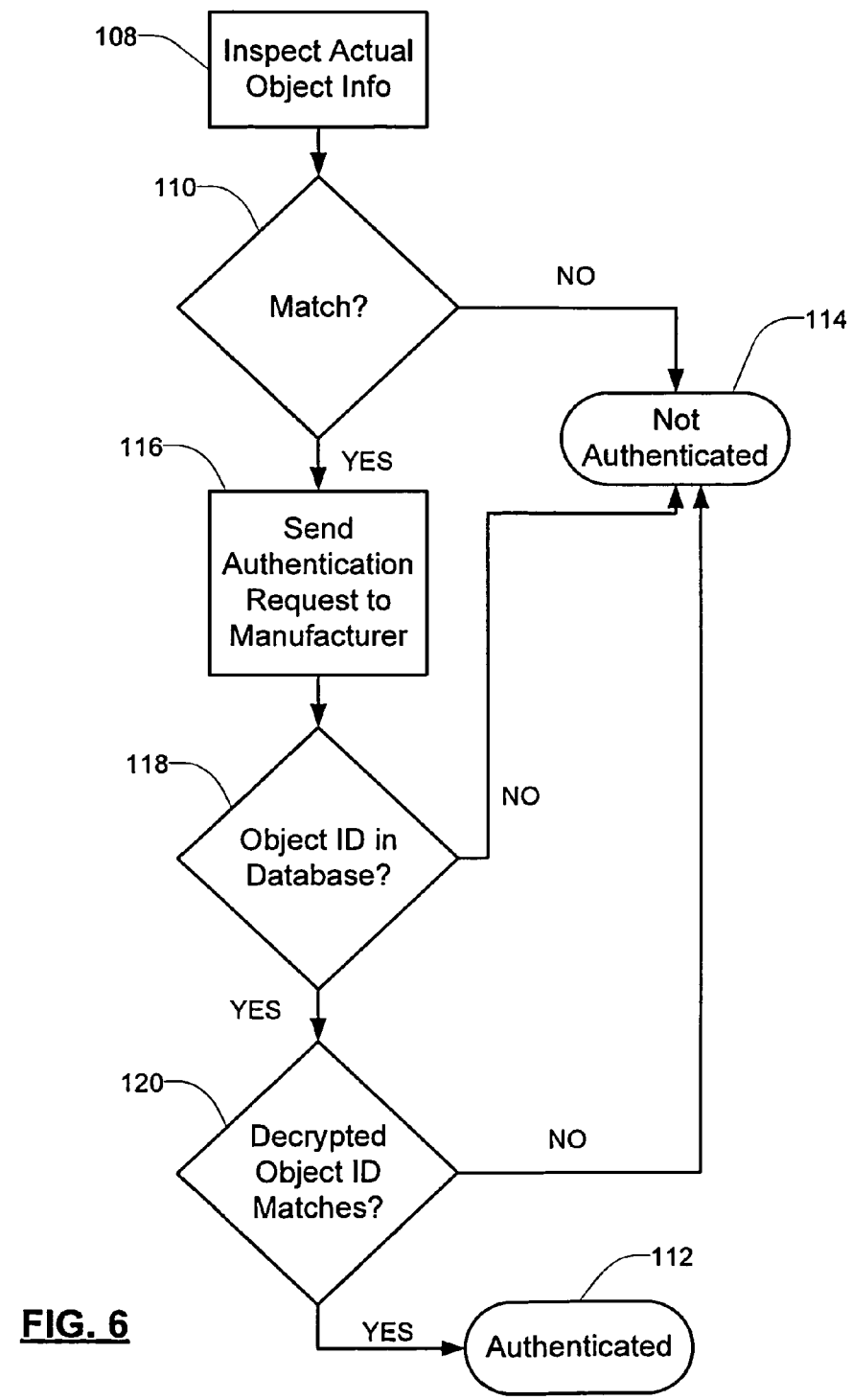
FIG. 6 is a flowchart showing a variation of the method of FIG. 5 according to another embodiment.

However, in some embodiments it may be desirable to provide a further level of authentication. Accordingly, in some embodiments, as shown in FIG. 6, additional authentication of the unknown object 13 may be performed.

For example, at step 116, an authentication request may be sent to the manufacturer 56 to confirm that the unauthenticated object 13 is in fact an authentic object. This may involve the user sending the decrypted object identifier to the manufacturer via the Internet 52, and/or sending the object identifier 23 in its encrypted state. In some embodiments, step 116 may take place after one or more of the steps as shown in FIG. 5 (e.g. after a determination has been made that the decrypted object information matches the actual object information at step 110). In other embodiments, the authentication request at step 116 may be performed entirely independently of the steps shown in FIG. 5.

At step 118, in some embodiments, the manufacturer 56 may determine whether the unknown encrypted object identifier 23 matches an entry stored in the manufacturing database 60. If the encrypted object identifier 23 does not match a record in the database 60, then this suggests that the encrypted object identifier 23 is not authentic and the method 100 proceeds to step 114 where the unknown object 13 is not authenticated.

Alternatively, if the encrypted object identifier 23 matches a record stored in the database 60, then this suggests that the encrypted object identifier 23 is valid and the method 100 proceeds to step 120.

At step 120, the decrypted object information (including for example the string information 25, the manufacturing information 27 and the random number 29) may be compared against actual information stored in the database 60. For example, each of the string of information 25, the manufacturing information 27 and the random data 29 may be compared with actual object information about objects as recorded in the database 60. If there is a match, then the method 100 proceeds to step 112 and the unknown object 13 is authenticated as an authentic object. In some embodiments, at this step the manufacturer 56 may notify the user that the unknown object 13 has been authenticated, which may include sending a message to the user using the communications device 54.

However, if there is no match, then the method 100 proceeds to step 114 and the unknown object 13 is not authenticated. For example, the unknown object 13 may be a counterfeit object that someone was attempting to pass off as genuine. Alternatively, the user may have incorrectly entered the unknown encrypted object identifier 23 (e.g. a data entry error may have occurred) when requesting authentication from the manufacturer 56. In such a case, the user may reattempt authentication using the correct encrypted object identifier 23.

In some embodiments, the manufacturer 56 may send a message to the user 50 indicating that the unknown object 13 has not been authenticated. The manufacturer 56 may also take other actions such as alerting certain entities (e.g. police or other authorities) that a possible counterfeit object has been identified.

The inclusion of random data 29 may tend to further enhance the robustness of the authentication system 10 by making it more difficult to guess valid object identifiers. In particular, the use of random data 29 used only once tends to ensure that each object identifier is unique (even for objects manufactured in series which may have identical component information data), and reduces the risk that someone other than the manufacturer 56 (e.g. a counterfeiter) can generates a counterfeit object identifier that matches an actual object identifier in the manufacturer database 60. When the manufacturer 56 compares the decrypted object information to determine whether the object information is consistent with the information in the database 60, the manufacturer 56 will spot counterfeit object identifiers.

The identification method 100 provides a first type of authentication for unknown objects using object identifiers. This identification method 100 can protect against some methods of counterfeiting. For example, if a counterfeiter makes a counterfeit object (e.g. a copy of an authentic object 12) with a counterfeit object identifier (e.g. something that looks legitimate but is actually composed of random alphanumeric characters), and tries to pass it off as a legitimate object, the object would not have a proper object identifier and thus would fail the identification method 100.

However, if a counterfeiter is able to make a perfect copy of an object and its object identifier (e.g. where the person has access to the legitimate object 12, and has the capability to duplicate the encrypted object identifier 22 associated with that object 12), then that person may be able to create a counterfeit object that will satisfy the above identification method 100, since the decrypted string information, manufacturing information, and random data from the counterfeit object will match the actual object information.

To counter this possibility, the system 10 may further determine whether a purported owner of the object is in fact a true owner of the object. By tracking and authenticating ownership, it tends to become more difficult for would-be counterfeiters to sell counterfeit goods.

In particular, as shown in FIGS. 1 and 2, the object identifier 22 may be linked to information about the actual owner of the object 12 in the form of an ownership certificate 30. The ownership certificate 30 contains the object identifier 22 (in its encrypted form) as well as ownership information 32 about the current owner of that particular object 12. The ownership certificate 30 may also include random data 34 to further enhance the robustness of the ownership certificate 30 similar to as discussed above. For example, the random data 34 may include a sequence of random alphanumeric characters used only once.

The encryption of the ownership certificate 30 may be carried out using a distribution private key 46 of a second set of public/private keys (e.g. distribution public/private keys) associated with the one or more distributors 57.

The ownership information 32 recorded in the ownership certificate 30 may include personal information about the current and/or previous owners of the object 12 as recorded by the distributor 57. For example, during an initial sale of the object 12 from the distributor 57 to the first user 50, the name of the first owner (e.g. the name of the first user 50), as well as address information, phone numbers, etc. may be recorded as ownership information 32.

In some embodiments, the first user 50 may purchase the object 12 directly through a store or other physical location associated with the distributor 57. In other embodiments, the first user 50 may purchase the object 12 via the Internet 52, for example by accessing a web page provided to the user 50 by a web server coupled to the distributor 57. As part of the purchase, the user 50 may need to login to the web page, such as by creating a user account on the web server (which may include a login name, password, and other information about the user 50, address information for shipping and billing, and information related to the method of payment such as credit card information). In some embodiments, the ownership certificate 30 may be separate from the object 12 and may sent to the user 50 through the mail, via a courier or using other means. In other embodiments, the ownership certificate 30 may be sent to the user 50 electronically (e.g. new certificate 64 as shown in FIG. 1) and may be printed as desired by the user 50 using a printer or other means.

In other embodiments, the ownership information 32 may be recorded by the distributor 57 during a subsequent transfer of an object between different users (i.e. between the first user 50 and second user 70).

In some embodiments, for example where the owner does not want to provide personal information, the ownership information 32 may instead include a passphrase, security code or other piece of data known only to the owner. Alternatively, the ownership information 32 may include a piece of data that is associated with a physical object or token (e.g. a serial number on a particular dollar bill, etc.) such that the person who has possession of the physical object or token will be considered to be the proper or authentic owner.

Figure 7:
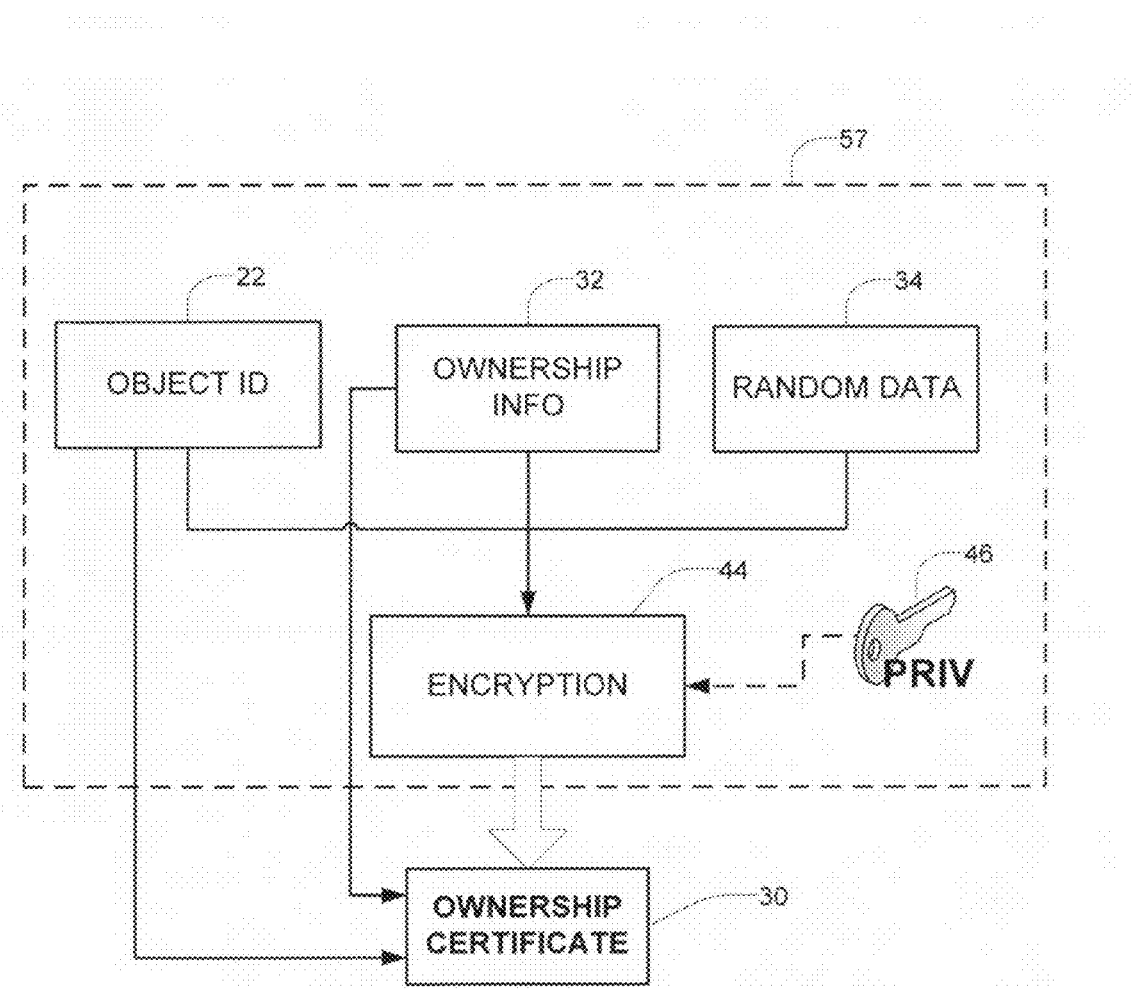
FIG. 7 is a schematic diagram of the ownership certificate of FIG. 2 encrypted using a second private key of a second public/private key pair.

As shown in FIG. 7, the ownership certificate 30 may be generated by encrypting the object identifier 22, the ownership information 32, and the random data 34 using the distribution private key 46 (shown schematically by an encryption block 44). In some embodiments, the encryption of the ownership certificate 30 may be performed by the distribution processor 59.

Furthermore, in some embodiments, for practical purposes, portions of the object identifier 22 and/or ownership information 32 may be provided in a clear (i.e. unencrypted) format as part of the ownership certificate 30, for example to allow the visual or other association of the ownership certificate 30 with the object identifier 22.

Once the ownership certificate 30 has been generated, the distributor 57 may then record a copy of the encrypted ownership certificate 30 in the distribution database 61. The distributor 57 may also record other ownership information about the object 12 along with the encrypted ownership certificate 30 in the database 61. For example, the object identifier 22, unencrypted ownership information 32 and/or random data 34 may also all be stored in the database 61. In alternative embodiments, the object identifier 22, unencrypted ownership information 32 and/or random data 34 may be recorded in the database 61, but the encrypted ownership certificate 30 is not recorded.

In some embodiments, the encrypted ownership certificate 30 is associated with the object 12. For example, the encrypted ownership certificate 30 may be affixed to the object 12 using a tamper-proof sticker or other visible tag, or may be recorded in an RFID tag or a bar code affixed to the object 12. In other embodiments, the ownership certificate 30 may be separate and need not be affixed to the object 12, but can simply be provided by the owner as needed to authenticate ownership.

The ownership certificate 30 is generally public such that it can be observed in its encrypted form by users who have access to the object 12. However, since the ownership certificate 30 was encrypted using the distribution private key 46, anyone with access to the corresponding public key 48 is able to decrypt the ownership certificate 30 to read the information contained therein. Thus, the ownership certificate 30 may be used to record ownership of objects 12 in a way that allows the information about the owner of the object 12 to be authenticated by people who have access to the distribution public key 48.

Figure 8:
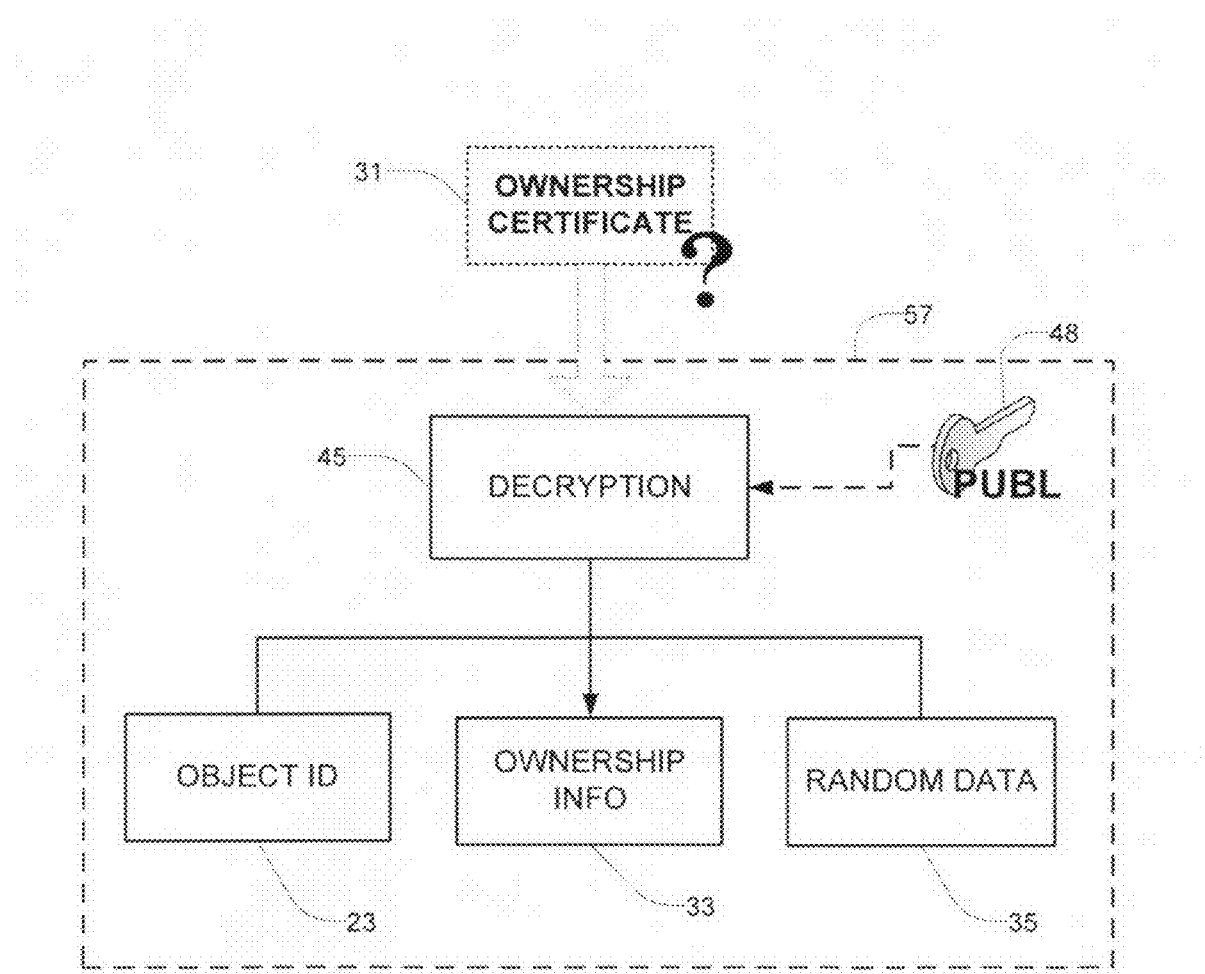
FIG. 8 is a schematic diagram of an unknown ownership certificate decrypted using a second public key of the second public/private key pair.

For example, as shown in FIG. 8, the unknown object 13 may have an encrypted ownership certificate 31 associated therewith. The ownership certificate 31 may be decrypted using the distribution public key 48 (shown schematically by a decryption block 45). For example, a person desiring to authenticate the ownership of the unknown object 13 may obtain the distribution public key 48 for that object 13 from the certificate authority 62. The decrypting of the encrypted ownership certificate 31 provides the object identifier 23, ownership information 33, and random data 35 associated with the unknown object 13. In some embodiments, by comparing this information to the information stored in the distribution database 61, the distributor 57 can determine whether the purported owner of the unknown object 13 is in fact the actual owner. Furthermore, in some embodiments, by comparing the decrypted information obtained to the information about the purported owner of the object 13, the user can determine whether the purported owner of the unknown object 13 is in fact the actual owner.

Figure 9:
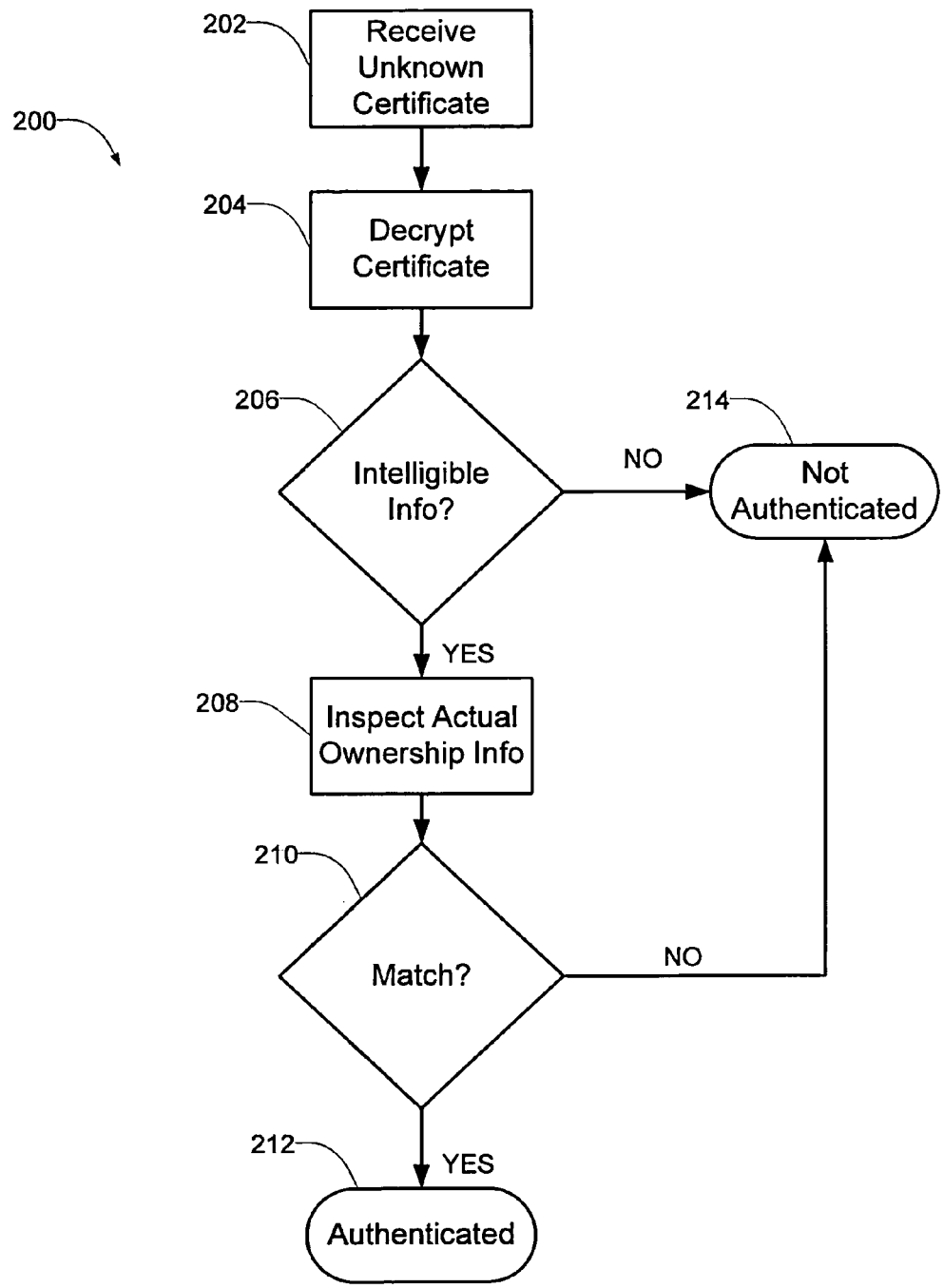
FIG. 9 is a flowchart showing a method of authenticating an owner of an object using an ownership certificate according to one embodiment.

For example, as shown in FIG. 9, according to some embodiments, a certification method 200 may be used to confirm the authenticity of ownership for objects.

At step 202, the unknown ownership certificate 31 is received. For example, the first user 50 may be selling the unknown object 13 to the second user 70, and the second user 70 may desire to authenticate the first user 50 as the actual owner of the unknown object 13 (thus reducing the risk that the first user 50 is a would-be counterfeiter). To authenticate the first user 50, the second user 70 obtains the ownership certificate 31 from the first user 50.

At step 204, the ownership certificate 31 is decrypted using the distribution public key 48 associated with the distributor 57 of the unauthenticated object 13 to reveal the object identifier 23, the ownership information 33 and the random data 35.

At step 206, a determination is made as to whether the decrypting performed at step 204 provided intelligible information (i.e. this information is legible and is not gibberish). If it did not, then this suggests that the ownership certificate 30 of the unknown object 13 is not authentic, and the method 200 proceeds to step 214 where the purported owner is not authenticated. However, if the information is intelligible, then the method 200 proceeds to step 208.

At step 208, an inspection is carried out to obtain the actual owner information. For example, this may involve inspecting identification associated with the purported owner (e.g. the first user 50) who is selling the unknown 13. In some embodiments, the purported owner may present a government issued identification card, a passport, or other authentication object to verify their identity. In examples where the person with possession of physical object or token is considered to be the authentic owner, this may involve presenting the physical object or token.

At step 210, the ownership information 33 obtained by decrypting the ownership certificate 31 at step 204 is compared to the actual ownership information obtained at step 208. If there is no match, then this suggests that the purported owner is not the actual owner, and the method 200 proceeds to step 214 where the purported owner is not authenticated. However, if there is a match at step 210 then this suggests that the purported owner is in fact the actual owner and the method 200 proceeds to step 212.

At step 212, the purported owner is authenticated as the actual owner.

Generally speaking, the method 200 as described above may be useful for performing a local authentication of the owners of objects, as a user may authenticate purported owners without intervention by a third party (provided that the user has the distribution public key).

Figure 10:
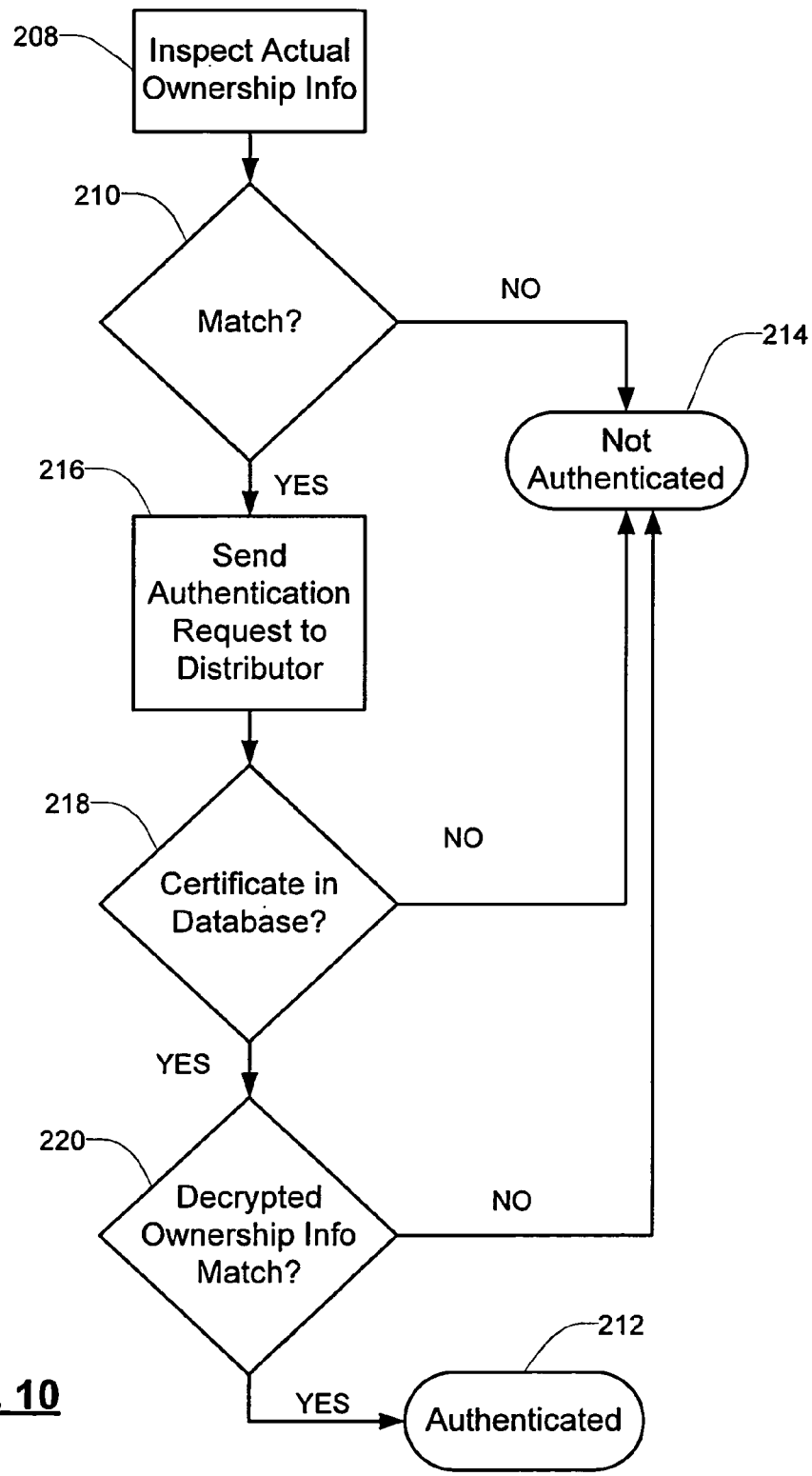
FIG. 10 is a flowchart showing a variation of the method of FIG. 9 according to another embodiment.

However, in some embodiments it may be desirable to provide a further level of authentication. Accordingly, in some embodiments, as shown in FIG. 10, additional authentication of purported owners may be performed.

For example, at step 216, an authentication request may be sent to the distributor 57 to authenticate a particular owner. The authentication request may include the ownership certificate 31 in an encrypted form and/or one or more of the object identifier 23, the ownership information 33 and the random data 35.

At step 218, in some embodiments, the distributor 57 may determine whether the ownership certificate 31 matches a record stored in the distribution database 61. If the ownership certificate 31 does not match a record in the database 61, then this suggests that the ownership certificate 31 is not authentic and the method 200 proceeds to step 214 where the purported owner is not authenticated. However, if the ownership certificate 31 matches a record in the database 61, then the method 100 proceeds to step 220.

At step 220, the decrypted information may be compared against information stored in the database 61. For example, one or more of the object identifier 23, the ownership information 33 and the random data 35 from the decrypted ownership certificate may be compared with the information about the owners of a particular object as recorded in the database 61. If there is a match, then the method proceeds to step 212 and the purported owner is authenticated. In some embodiments, the distributor 57 may notify the user that the owner has been authenticated, which may include sending a message to the user using the communications device.

However, if there is no match, then the method proceeds to step 214 and the purported owner is not authenticated. For example, the purported owner may be a counterfeiter attempting to pass off a counterfeit object as genuine. In some embodiments, the distributor 57 may send a message to the user indicating that the purported owner has not been authenticated. The distributor 57 may take other actions such as alerting certain entities (e.g. police or other authorities) that a possible counterfeiter has been identified In particular, the matching at step 220 may include comparing the object identifiers, the ownership information and/or the random data between of the decrypted ownership certificate 31 and data recorded in a corresponding data entry in the database 61. As described above, the use of random data tends to further reduce the chance that a would-be counterfeiter could successfully guess a valid ownership certificate.

It will of course be understood that, once the object identifier 23 has been obtained, the distributor 57 may conduct authentication of the actual object itself 13, such as by performing method 100 and/or sending a request for authentication to the manufacturer 56 (as generally described above).

Thus, the identification method 200 provides a second type of authentication for owners of unknown objects using ownership certificates. By authenticating the ownership of the objects, it tends to become less likely that a would-be counterfeiter would be able to successfully sell counterfeit objects.

Figure 11:
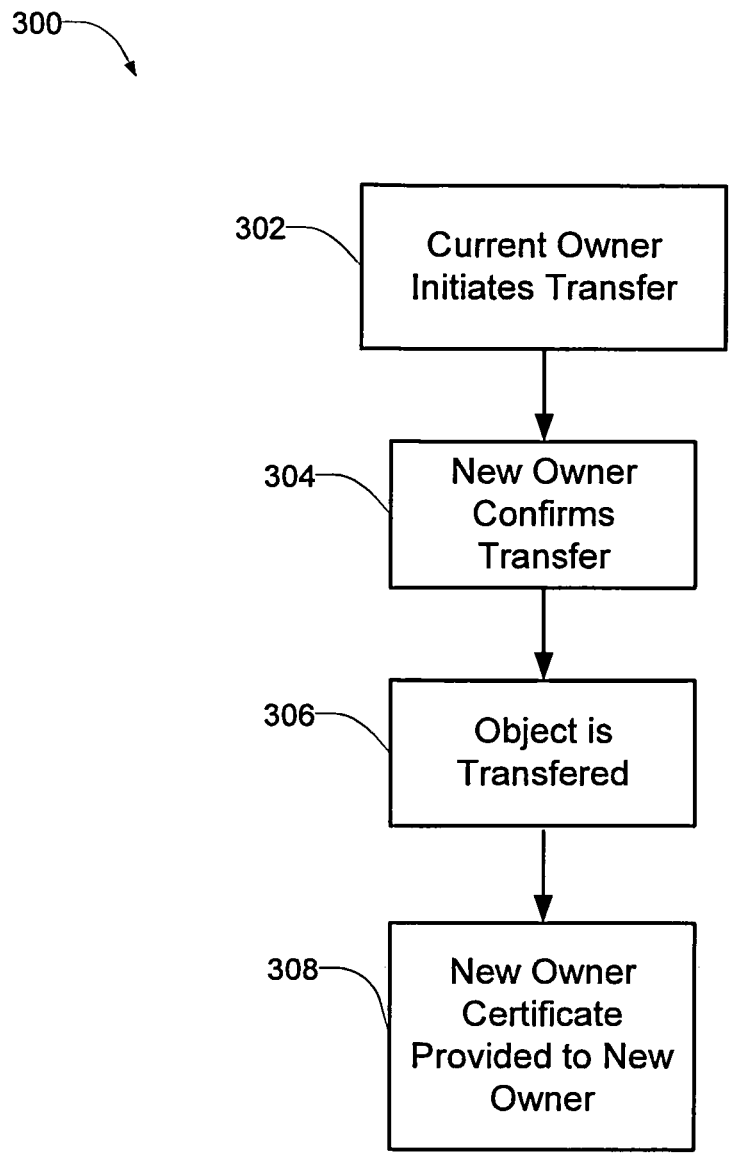
FIG. 11 is a flowchart showing a method of transferring ownership of an object according to another embodiment.

In some embodiments, it is desirable that users may transfer ownership of an object (for example, the first user 50 may sell the object 12 to the second user 70). An ownership transfer method 300 is shown in FIG. 11.

At step 302, one of the users initiates the transfer of ownership by communicating with one of the distributors. For example, the first user 50 may login to a web page provided by the distributor 57 to indicate that a sale of the object 12 is being made, and may indicate that the second user 70 will be the new owner.

At step 304, a second user (e.g. the new owner) then communicates with the same distributor to confirm the change in ownership. For example, the second user 70 may login to another web page provided by the distributor 57 (and which may require the second user 70 to create a second user account, with a login name, password, etc.) to confirm that the second user 70 will be the new owner of the object 12.

At step 306, the physical transfer of the object 12 occurs. This may involve the first user 50 and second user 70 meeting in person and exchanging the object 12 for some form of payment. Alternatively, the object 12 and/or payment may be sent via an intermediary, such as a courier. In some embodiments, one or both of the users 50, 70 may communicate with the distributor 57 after the transfer of ownership to confirm that the physical transfer has taken place.

At step 308, the new ownership certificate is provided to the new owner. In some embodiments, this may involve the creation of a new physical ownership certificate by the distributor 57, and physical delivery of the new ownership certificate to the new owner (e.g. the second user 70), as well as recording the new ownership information in the database 61. In other embodiments, the new ownership certificate may be sent to the new owner electronically (e.g. new certificate 64 as shown in FIG. 1), and the new owner may print the ownership certificate using a printer or other means.

Figure 12:
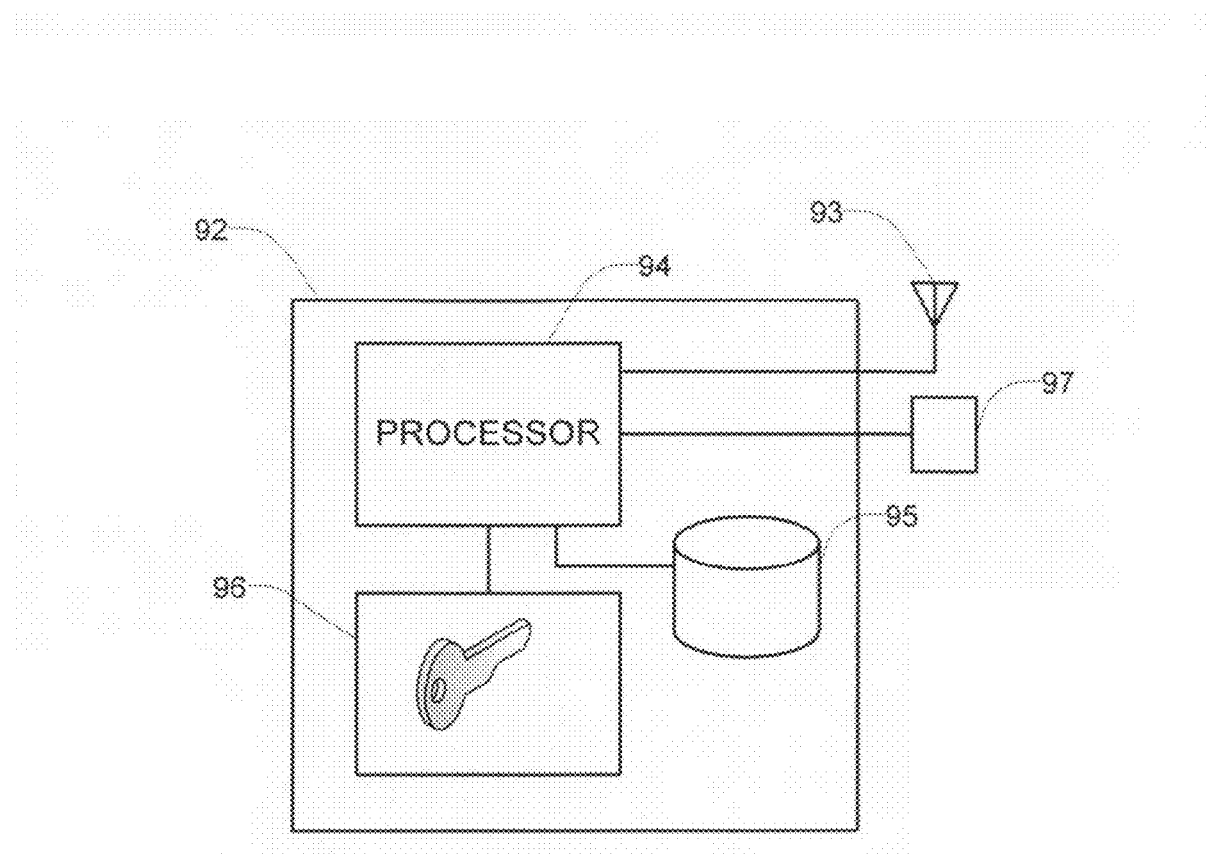
FIG. 12 is schematic diagram of an apparatus for authenticating objects according to another embodiment.

Turning now to FIGS. 2 and 12, in some embodiments, each component 14, 16, 18 and 20 of an object may include an RFID tag or other remotely readable tag (e.g. visual or optical tag) associated therewith that is capable of broadcasting or displaying its identification data. For example, the first component 14 may include a first RFID tag 80, the second component may have a second RFID tag 82, the third component 18 may have a third RFID tag 84, and the fourth component 20 may have a fourth RFID tag 86. In such embodiments, the object identifier 22 and the ownership certificate 30 may also have RFID tags 88, 90 or other remotely readable tags capable of broadcasting and/or displaying information about the object identifier 22 and ownership certificate 30.

In some embodiments, the RFID tags 80, 82, 84 and 86 for each component 14, 16, 18 and 20 may also store identification information about at least one other component 14, 16, 18 and 20, and may, for example, include identification data of one or more adjacent components 14, 16, 18 and 20, and/or information about the particular arrangement (e.g. the pattern, configuration or sequence) of the components 14, 16, 18 and 20.

It may be possible to automatically query the RFID tags 80, 82, 84 and 86 for each component 14, 16, 18 and 20 and compare this information with the object identifier 22 and/or the ownership certificate 30. For example, a tag reader 92 as shown in FIG. 10 may be used to read the RFID tags.

The tag reader 92 may include an antenna 93 for communicating with the RFID tags 80, 82, 84, 86, 88 and 90, a processor 94 for receiving the information from the RFID tags 80, 82, 84, 86, 88 and 90, a memory or database 95 coupled to the processor 94 for storing information about the RFID tags 80, 82, 84, 86, 88 and 90 and/or the object 12 and a decryption module 96 for decrypting the object identifier 22 and/or the ownership certificate 30.

In some embodiments, the tag reader 92 may be used to automatically query the object 12 about the components 14, 16, 18 and 20 associated therewith, including their identification data and arrangement information (e.g. pattern, configuration or sequence). This information can be compared manually or automatically to the decrypted information obtained by the decryption module 96 decrypting the object identifier 22 to detect inconsistencies in the object information. For example, in some embodiments, the database 95 may include all or a subset of the information stored in the manufacturing database 60, and may be used by the processor 94 to automatically perform an identification method 100 using the tag reader 92.

In other embodiments, the tag reader 92 may be similarly used to automatically query an ownership certificate 30 about the data associated therewith, allowing decrypted ownership certificate information to be compared with actual object and owner information. This information can be compared automatically to the decrypted information obtained by the decryption module 96 decrypting the ownership certificate 30 to detect inconsistencies in the ownership certificate information. For example, the database 95 may include all or a subset of the information stored in the distribution database 59, and may be used by the processor 94 to automatically perform an identification method 200 using the tag reader 92.

The tag reader 92 may also include an additional input device 97 such as an optical reader or a bar code scanner for reading the object identifier 22 and/or component identification data 962, 766, 327, 616 of the components 14, 16, 18 and 20.

The processor 94 can receive component identification data as well as object identifier 22 data. The memory or database 95 coupled to the processor 94 can store information about the component identification data, object identifier 22 data and/or about the object 12. The decryption module 96 may be used for decrypting the object identifier 22 and/or the ownership certificate 30.

In some embodiments, the tag reader 92 may be used to manually or automatically query the object 12 about the components 14, 16, 18 and 20 associated therewith, including their identification data and arrangement information (e.g. pattern, configuration or sequence). This information can be compared manually or automatically to the decrypted information obtained by the decryption module 96 decrypting the object identifier 22 to detect inconsistencies in the object information. For example, the database 95 may include all or a subset of the information stored in the manufacturer database 60, and may be used by the processor 94 to automatically perform an identification method 100 using the tag reader 92.

In some embodiments object identifier 22 and component identification data 962, 766, 327, 616 and ownership certificate data may be manually input (using a keyboard or other input means). In other embodiments, the tag reader 92 may be similarly used to manually or automatically query an ownership certificate 30 about the data associated therewith and allowing decrypted ownership certificate information to be compared with actual object identifier and owner information. This information can be compared manually or automatically to the decrypted information obtained by the decryption module 96 decrypting the ownership certificate 30 to detect inconsistencies in the ownership certificate information. For example, the database 95 may include all or a subset of the information stored in the distributor database 59, and may be used by the processor 94 to automatically perform an identification method 200 using the tag reader 92.

In some embodiments object identifier 22 and component identification data 962, 766, 327, 616 and ownership certificate data may be manually input.

While the above description provides examples of one or more systems, methods, and apparatuses, it will be appreciated that other systems, methods, and apparatuses may be within the scope of the present description as understood by one of skill in the art.

The invention claimed is:

1. A method of authenticating objects, comprising:
 a) receiving an encrypted object identifier at a processor adapted to decrypt the encrypted object identifier, the encrypted object identifier being associated with an unknown object having multiple discrete components, wherein the object identifier includes encrypted object information including unknown identification data for each of a plurality of the multiple components, the unknown identification data including unknown object arrangement information indicative of a way in which the multiple components are arranged relative to each other;
 b) decrypting the encrypted object identifier using the processor and a first public key of a first public/private key pair to obtain decrypted unknown object information including decrypted unknown identification data for each of the plurality of the multiple components;
 c) inspecting the unknown object to obtain actual object information including actual identification data for each of the plurality of the multiple components, the actual identification data of the multiple components including actual arrangement information indicative of a way in which the multiple components are arranged relative to each other; and
 d) comparing the unknown identification data with the actual identification data, including comparing the unknown arrangement information with the actual arrangement information, to determine whether the unknown object is an authentic object, wherein the authentic object has an object identifier generated using a first private key of the first public/private key pair.

2. The method of claim 1, wherein the actual arrangement information includes one or more of pattern, configuration or sequence data about the multiple components.

3. The method of claim 1, further comprising comparing the unknown object information with actual object information recorded in at least one computer-implemented database to determine whether the unknown object is an authentic object.

4. The method of claim 3, wherein:
 a) the actual object information includes actual manufacturing information recorded in at least one computer-implemented database;
 b) the unknown object information includes unknown manufacturing information; and
 c) the comparing step includes comparing the actual manufacturing information with the unknown manufacturing information to determine whether the unknown object is an authentic object.

5. The method of claim 3, wherein:
 a) the actual object information includes actual random data recorded in at least one computer-implemented database;
 b) the unknown object information includes unknown random data; and
 c) the comparing step includes comparing the unknown random data with the actual random data to determine whether the unknown object is an authentic object.

6. The method of claim 1, wherein:
 a) each of the multiple components of the unknown object has an RFID tag associated therewith;
 b) each RFID tag contains the actual identification data for the associated component; and
 c) the method further comprises providing a tag reader configured to read the RFID tags and perform the comparing step to determine whether the unknown object is an authentic object.

7. The method of claim 1, wherein:
 a) each of the multiple components of the unknown object has an optical tag associated therewith;
 b) each optical tag contains the actual identification data for the associated component; and
 c) the method further comprises providing an optical tag reader configured to read the optical tags and perform the comparing step to determine whether the unknown object is an authentic object.

8. The method of claim 7, wherein each optical tag is a bar code and the optical tag reader is a bar code reader.

9. The method of claim 1, further comprising:
 a) receiving an ownership certificate associated with the unknown object;
 b) decrypting the ownership certificate using the processor and a second public key of a second public/private key pair to obtain actual ownership information for the unknown object;
 c) inspecting purported ownership information about a purported owner of the unknown object; and
 d) comparing the actual ownership information obtained by decrypting the ownership certificate with the purported ownership information about the purported owner to determine whether the purported owner is the actual owner.

10. The method of claim 9, wherein the ownership certificate was encrypted using a processor adapted to encrypt and a second private key of the second public/private key pair.

11. The method of claim 9, further comprising comparing the purported ownership information obtained by decrypting the ownership certificate with ownership information recorded in at least one computer-implemented database to determine if the purported owner is the actual owner.

12. The method of claim 11, wherein the comparing of the purported ownership information obtained with the ownership information recorded in at least one computer-implemented database includes comparing random data decrypted from the ownership certificate with actual random data stored in at least one computer-implemented database.

13. A method of facilitating authentication of objects, comprising:
 a) providing an authentic object having multiple discrete components, each component having actual identification data associated therewith, the actual identification data of the multiple components including actual arrangement information indicative of a way in which the multiple components are arranged relative to each other;
 b) generating an encrypted object identifier using a processor adapted to encrypt and a first private key of a first public/private key pair to encrypt actual object information including the actual identification data about the multiple components of the object; and
 c) associating the object identifier with the authentic object.

14. The method of claim 13, further comprising:
 a) receiving an unknown object identifier at a processor adapted to decrypt the unknown object identifier, the unknown object identifier being associated with an unknown object having multiple components;
b) decrypting the unknown object identifier using the processor adapted to decrypt and a first public key of the first public/private key pair to obtain unknown object information including unknown identification data, the unknown identification data including unknown arrangement information indicative of a way in which the multiple components are arranged relative to each other;
c) inspecting the unknown object to obtain actual object information including the actual identification data for the multiple components, the actual identification data including the actual arrangement information; and
d) comparing the unknown identification data with the actual identification data, including comparing the unknown arrangement information with the actual arrangement information, to determine whether the unknown object is the authentic object.

15. The method of claim 14, further comprising comparing the unknown object information with object information recorded in at least one computer-implemented database to determine whether the unknown object is an authentic object.

16. The method of claim 15, wherein:
a) the actual object information further includes actual manufacturing information about the object recorded in at least one computer-implemented database;
b) the unknown object information includes unknown manufacturing information; and
c) the comparing step includes comparing the actual manufacturing information with the unknown manufacturing information to determine whether the unknown object is an authentic object.

17. The method of claim 15, wherein:
a) the actual object information includes actual random data recorded in at least one computer-implemented database;
b) the unknown object information includes unknown random data; and
c) the comparing step includes comparing the unknown random data with the actual random data to determine whether the unknown object is an authentic object.

18. The method of claim 14, further comprising:
a) generating an ownership certificate for the authentic object using the processor adapted to encrypt and a second private key of a second public/private key pair to encrypt actual ownership information associated with the object; and
b) associating the ownership certificate with the authentic object.

19. The method of claim 18, further comprising:
a) receiving an ownership certificate associated with the unknown object at the processor adapted to decrypt;
b) decrypting the ownership certificate using the processor adapted to decrypt and a second public key of the second public/private key pair to obtain actual ownership information for the unknown object;
c) inspecting purported ownership information about a purported owner of the unknown object; and
d) comparing the actual ownership information obtained by decrypting the ownership certificate with the purported ownership information about the purported owner to determine whether the purported owner is the actual owner of the unknown object.

20. A system for authenticating objects, comprising:
a) at least one computer-implemented database for storing data records associated with at least one object; and
b) at least one processor coupled to the database, the at least one processor being operable to:
   i. receive an encrypted object identifier associated with an unknown object of the at least one object, the unknown object having multiple discrete components, wherein the object identifier includes encrypted object information including unknown identification data for each of a plurality of the multiple components, the unknown identification data including unknown object arrangement information indicative of a way in which the multiple components are arranged relative to each other;
   ii. decrypt the encrypted object identifier using a first public key of a first public/private key pair to obtain decrypted unknown object information including unknown identification data for each of the plurality of the multiple components;
   iii. receive actual object information including actual identification data for each of the plurality of the multiple components obtained from inspecting the unknown object, the actual identification data of the multiple components including actual arrangement information indicative of a way in which the multiple components are arranged relative to each other; and
   iv. compare the unknown identification data with the actual identification data, including comparing the unknown arrangement information with the actual arrangement information to determine whether the unknown object is an authentic object, wherein the authentic object has an object identifier generated using a first private key of the first public/private key pair to encrypt the actual object information.

* * * * *